United States Patent [19]
Al Nema et al.

[11] 3,919,622
[45] Nov. 11, 1975

[54] COMMUTATION CHOPPER CIRCUIT WITH INDEPENDENT TRIGGER

[75] Inventors: Mudhafar A. Al Nema, Mosul, Iraq; Wellington W. Koepsel, Manhattan, Kans.

[73] Assignee: The Kansas State University Research Foundation, Manhattan, Kans.

[22] Filed: Mar. 27, 1974

[21] Appl. No.: 455,293

[52] U.S. Cl............. 321/45 C; 307/252 M; 318/345
[51] Int. Cl.²....................................... H02M 7/515
[58] Field of Search............ 321/34, 45 C; 318/341, 318/345; 307/252 M

[56] References Cited
UNITED STATES PATENTS

| | | | |
|---|---|---|---|
| 3,354,322 | 11/1967 | Eastop | 307/252 M |
| 3,530,503 | 9/1970 | Appelo et al. | 321/45 C |
| 3,548,216 | 12/1970 | Burch | 307/252 M |

FOREIGN PATENTS OR APPLICATIONS

| | | | |
|---|---|---|---|
| 1,159,072 | 12/1963 | Germany | 321/45 C |
| 1,174,086 | 12/1969 | United Kingdom | 321/45 C |

*Primary Examiner*—Gerald Goldberg
*Attorney, Agent, or Firm*—Dawson, Tilton, Fallon & Lungmus

[57] ABSTRACT

A commutation chopper circuit is disclosed for supplying an alternating voltage from a constant voltage source, such as a battery, to a motor or the like. The battery is coupled to the motor by means of a controlled switch, such as a silicon control rectifier or thyristor. A secondary cutoff loop circuit is provided across the primary switch, including a secondary switch and a capacitor, the capacitor being connected in the negative terminal of the primary switch. When the primary switch is conducting, an independent source charges the capacitor to a polarity such that when the secondary switch conducts, the capacitor will be applied across the terminals of the primary switch to reverse bias it; and a load current will be shunted through the secondary switch and the capacitor in series. After the primary switch is cut off, the load current diminishes to zero, and the secondary switch is also non-conducting, and the cycle may be repeated.

4 Claims, 3 Drawing Figures

COMMUTATION CHOPPER CIRCUIT WITH INDEPENDENT TRIGGER

BACKGROUND AND SUMMARY

The present invention relates to a commutation chopper circuit for supplying pulses from a constant source of voltage to a motor. "Commutation" refers to the turning off of a controlled device to disconnect an energy source from the motor. Such commutation may be used in the case of a direct current motor to vary speed. In addition to speed control, there are advantages in efficiency, cost and weight in such systems where the only source of power may be a battery. Applications include electric vehicles, fork-lift trucks, golf carts, etc. As a practical matter, the principal circuit element for switching currents of this size is a silicon control rectifier (SCR), however, in theory at least, there is no reason why other controlled switches, either solid state or vacuum tube, could not be used.

There are many chopper circuits which have been suggested or used in the prior art for commutating a DC source with a motor. One such circuit is disclosed in detail above, but briefly it has the disadvantage that an oscillation between the load and source can exist when the secondary SCR conducts. This oscillation is caused by the interchange of energy between the commutation capacitor and the inductive load. Because of this oscillation, it may happen that the primary SCR will not turn off and commutation will then fail. When this happens in the prior art circuit discussed in detail within, the primary SCR may remain in a conductive state indefinitely; and there is no commutation. Commutation failure may also be caused if the load produces a high counter emf, or, under certain conditions of no-load, overload, or sudden load changes, the commutation capacitor may lose its charge and therefore fail to shut off the primary SCR.

In the present invention, there is provided a secondary loop circuit across the power terminals of the primary SCR including a secondary SCR and a commutation capacitor with the capacitor connected between the negative terminals of the SCRs (the cathodes). A charging loop with an independent voltage source is connected across the series combination of the primary SCR and the commutation capacitor.

When the primary SCR conducts it, of course, connects the primary source of power to the load. At the same time, however, conduction of the primary SCR enables the independent voltage source to charge the commutation capacitor in such a way that the positive charge voltage on the commutation capacitor is connected to the cathode of the primary SCR. When it is desired to shut off the primary SCR, the secondary SCR is caused to conduct; and this connects the commutation capacitor directly across the power terminals of the primary SCR and shuts off the primary SCR. At this time, the load current is shunted through the secondary SCR and the commutation capacitor; and it will diminish to zero rapidly because the commutation capacitor is in series with the motor, thereby shutting off the secondary SCR and leaving the circuit in condition for renewing the commutation cycle.

A principal feature of the inventive system is that by using an independent voltage generator for supplying energy to the commutation capacitor, reliability of commutation is greatly increased. Further, should the commutation capacitor lose its charge, subsequent commutation is not effected because it is charged during each cycle by an independent source. In other words, the commutation circuit is, for practical purposes, independent of the operation of the other circuits in the chopper system; and this has been found to produce a more reliable system. Further, there is an economic advantage of the present system in that the size of the commutation capacitor may be smaller than that of the conventional chopper system discussed.

Other features and advantages of the present invention will be apparent to persons skilled in the art from the following detailed description of a preferred embodiment wherein identical reference numerals will refer to like parts in the various views.

THE DRAWING

DETAILED DESCRIPTION

Figure 1:
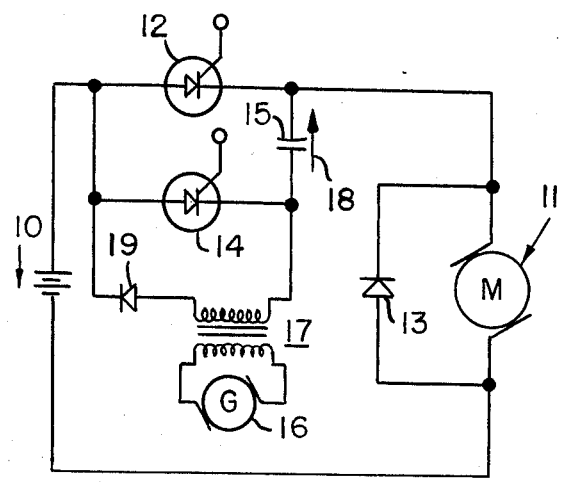
FIG. 1 is an abbreviated circuit schematic diagram of a system incorporating the present invention.

Referring first to FIG. 1, a constant voltage source is generally designated 10, and a motor 11. A primary SCR 12 is used to periodically connect the positive terminal of the source 10 with one terminal of the motor 11, the negative terminals of the motor and source being directly connected. A diode 13 may be connected across the terminals of the motor 11 and clearly shown to short negative voltage spikes around the motor. The motor 11 may be a DC motor, although the field windings are not shown. It is known that such a load has the characteristics of an inductor in series with a resistor.

A secondary SCR 14 has its anode connected to the anode of the primary SCR 12; and a commutation capacitor 15 is connected between the cathodes of the primary and secondary SCRs 12, 14.

A generator 16 is coupled by means of a transformer 17 to charge the capacitor 15 in the polarity shown by the arrow 18 when the primary SCR 12 is in the conducting state. A diode 19 is connected with the polarity shown in series with the secondary winding of the transformer 17, the primary SCR 12, and the commutation capacitor 15.

In brief, the circuit of FIG. 1 operates as follows. When the primary SCR 12 conducts (the secondary SCR 14 being in a non-conducting state), the source 16 charges the commutation capacitor 15 in the direction of the arrow 18—that is, the terminal with positive polarity is directly connected to the cathode of the SCR 12. At the same time, of course, the source 10 is connected to the load 11. When it is desired to shut off the primary SCR, a positive pulse is transmitted to the gate of the SCR 14, causing it to conduct. This causes the commutation capacitor 15 to be connected directly across the terminals of the primary SCR 12 in such a polarity as to shut it off. The load current is shunted through the secondary SCR 14 and the commutation capacitor 15. The commutation capacitor 15 must be of sufficient size that it will maintain a terminal voltage for such duration as to insure cutoff of the primary SCR 12. After that time, however, the load current diminishes to zero because the commutation capacitor 15 is in series with the load. Hence, the secondary SCR 14 also shuts off. It will be observed that the effect of the independent source 16 is simply to provide adequate charge on the capacitor 15 to assure turn-off of the primary SCR 12.

With both SCRs 12, 14 shut off, no current flows to the load; and the circuit is in condition for retriggering the primary SCR 12; and the cycle repeats itself.

Figure 3:
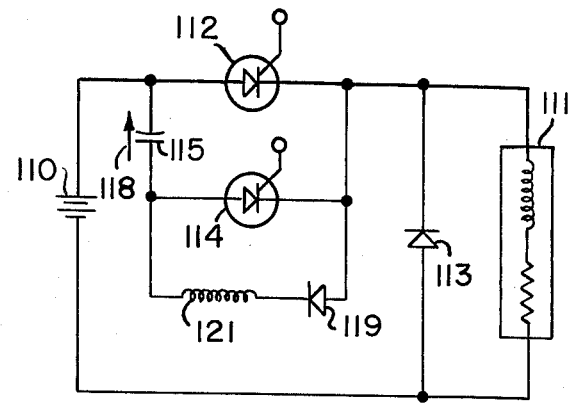
FIG. 3 is an abbreviated circuit schematic diagram of a prior art system.

In contrast, the circuit of FIG. 1, the prior art circuit of FIG. 3 has the commutation capacitor 115 connected between the anodes of a primary SCR 112 and a secondary SCR 114. In this circuit, a conventional passive inductor 121 is connected in series with a diode 119 across the secondary SCR 114.

The circuit of FIG. 3 operates in this manner. Assume the secondary SCR 114 to be conducting. The commutation capacitor will charge to a voltage equal to that of the source 110 in the polarity of the arrow 118. Eventually the current will be reduced to zero because the primary SCR 112 is not conducting, and the capacitor 115 is in series with the source 110 and load 111. When the load current reduces to zero, the secondary SCR 114 will become non-conducting.

Now, the primary SCR 112 may be caused to conduct, thereby supplying load current. At the same time, the commutation capacitor is permitted to discharge in a ringing circuit through the conducting primary SCR 112, the diode 119 and the inductor 121. This will reverse the polarity on the commutation capacitor 115 from that shown by the arrow 118. Theoretically, the value of the voltage to which it charges is equal to the magnitude of the source 110. Because of the ringing circuit and the diode 119, after a one-half cycle of the ringing current, current in this loop stops because the diode 119 will be reverse biased.

Next, when the secondary SCR 114 conducts, the commutation capacitor 115 will be connected across the primary SCR 112 in such a manner that the primary SCR 112 will be reverse biased. Load current is shunted through the commutation capacitor and the secondary SCR 114, and the primary SCR 112 shuts off.

It will be observed that in the system of FIG. 3, if, during the conducting of the primary SCR 112, there is any oscillation between the load and the source, the voltage at the positive terminal of the motor may be higher than normal, thereby raising the cathode of the primary SCR 112 to a positive voltage higher than design. This will diminish the net voltage causing the ringing current in the loop including diode 119 and inductor 121; and the net result may be that the capacitor 115 has a diminished reverse voltage or a voltage so small that it will not be able to shut off the primary SCR 112 when the secondary SCR 114 conducts. The same effect can result from the counter emf of the load when it is a motor. Further, no load, overload or sudden load changes as might be encountered by abrupt changes in the mechanical load on the motor may cause the commutation capacitor to lose its charge so that it will be unable to turn off the main SCR. Once the commutation capacitor 115 loses its charge to a point where it is not able to shut off the primary SCR 112 when the secondary SCR 114 conducts, the system will lose its ability to commutate because the reverse charge built up on the capacitor 115 depends upon the development of a forward charge in the direction of the arrow 118; and this can be caused only when the primary SCR 112 is nonconducting.

In contradistinction, the system of FIG. 1 builds up a reverse-biased voltage on the commutation capacitor 15 whenever the primary SCR 12 conducts. Hence, even if the secondary SCR 14 did not conduct for a number of cycles, it would not affect subsequent operation because the commutation capacitor 15 would maintain its charge.

Another way to state the distinction between the two circuits, realizing that the problem comes about in turning off the primary SCR (not turning it on), is that whereas the turn-off voltage on the commutation capacitor 115 of FIG. 3 depends upon turn-off of the primary SCR 112 for the prior art system, the turn-off voltage on the commutation capacitor 15 depends on the conduction of the primary SCR 12 for the system of FIG. 1.

Figure 2:
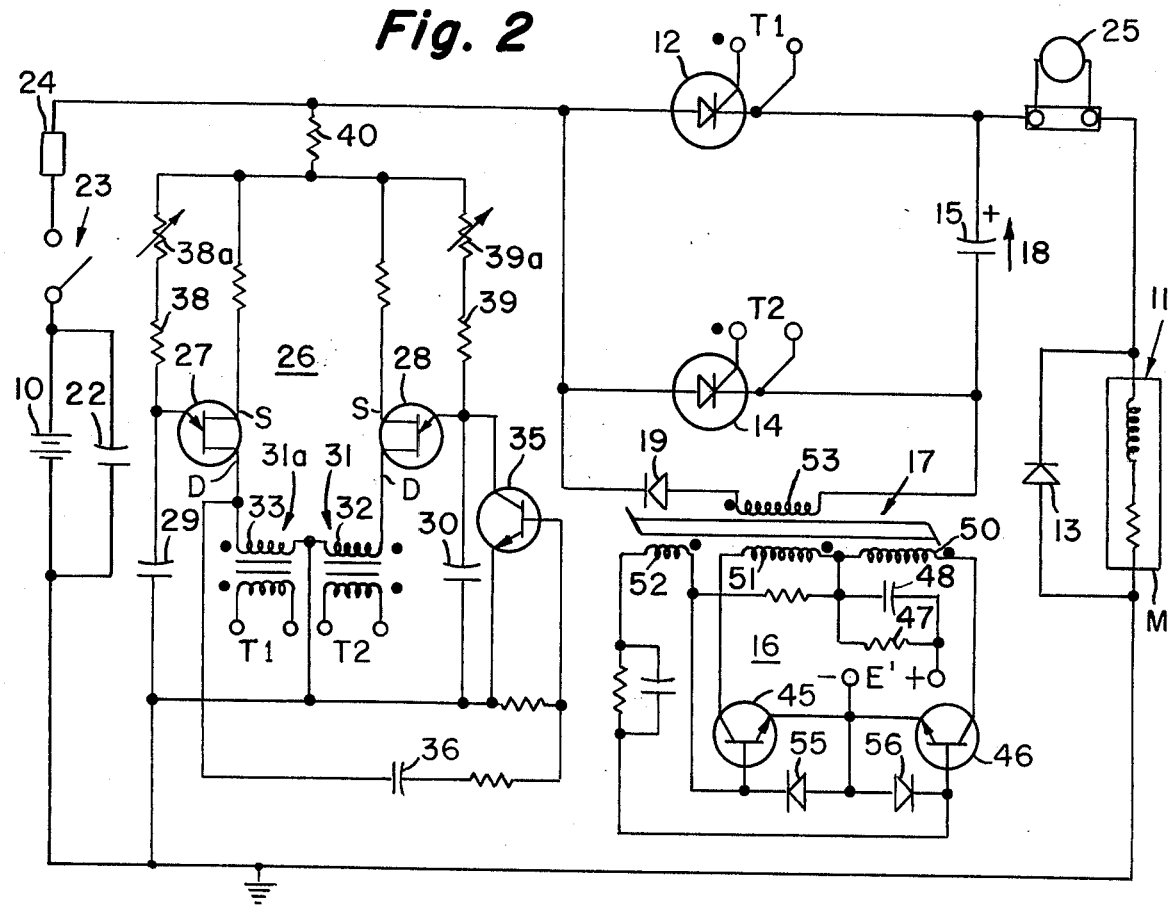
FIG. 2 is a more detailed circuit schematic diagram of the system of FIG. 1.

Turning now to FIG. 2, those elements of FIG. 1 which are repeated have identical reference numerals. In addition, the circuitry may include a capacitor 22 connected across the source 10 for smoothing ripples, a main switch 23, a fuse 24, and an ammeter 25. Reference numeral 26 generally designates circuitry for triggering the SCRs 12, 14.

Turning now to the trigger circuitry 26, a first unijunction transistor 27 has a source terminal S and a drain D. A second unijunction transistor 28 has similar terminals, and each unijunction is provided with a gate or input terminal which, as is known, will cause the unijunction to conduct (that is, have a low resistance between source S and drain D as long as a positive voltage is applied.

A capacitor 29 is connected between the gate of the unijunction 27 and ground; and a second capacitor 30 is connected between the gate of the unijunction 28 and ground. A pair of transformers generally designated 31 and 31a have a common terminal grounded. Transformer 31 has a primary winding 32 connected between ground and the lead D of unijunction 28; and transformer 31a has a second primary winding designated 33 which is connected between ground and the lead D of unijunction 27. There are two outputs associated respectively with the primary windings 33, 32; and they are designated T1 and T2 in the polarity shown. Windings T1 and T2 are connected respectively in suitable polarity to trigger the SCRs 12, 14, as illustrated.

A transistor 35 has its collector and emitter connected across the capacitor 30, and its base connected by means of a capacitor 36 to the drain D of the unijunction 27. A fixed resistor 38 and a variable resistor 38a are connected in series with the capacitor 29, and a similar fixed resistor 39 and variable resistor 39a are connected in series with the capacitor 30.

In operation, when the switch 23 is closed, current will flow through a resistor 40 and the resistors 38a and 38 to charge the capacitor 29. When the capacitor 29 reaches a sufficient voltage, it will cause the unijunction 27 to conduct; and a positive pulse will be fed to the primary 33 of transformer 31. This pulse will cause a positive pulse on the secondary T1, thereby causing the primary SCR 12 to conduct. The pulse on the primary 33 is differentiated through capacitor 36 to cause the transistor 35 to conduct, thereby shorting the capacitor 30 and dissipating its charge. The time constant for the charging of capacitor 29 may be varied by charging the value of resistor 38a, and its charging time constant should be longer than the corresponding capacitor 30 so that unijunction 27 fires first.

After the pulse from unijunction 27 is differentiated through capacitor 36, the base current in transistor 35 will diminish, and it will shut off, thereby re-initiating a charge cycle for the capacitor 30.

When the capacitor 30 achieves sufficient voltage, it will cause unijunction 28 to fire, thereby generating a pulse at the output T2 of the transformer 31, and triggering the secondary SCR 14. The charge on the capacitor 29 will subsequently dissipate, and the unijunction 27 will shut off. Thus, the trigger circuit 26 comprises a first monostable circuit (including unijunction transistor 27) and a second monostable circuit (including unijunction transistor 28) wherein the second monostable is triggered a predetermined and settable time after the first one is triggered and in response to the triggering of the first monostable. Speed variation for the system is accomplished by varying the duty cycle of oscillator 26. Specifically, resistor 39a varies the oscillator's duty cycle by varying the charge rate of capacitor 30 which, in turn, varies the firing time for the unijunction 28.

Turning now to the voltage source 16, it includes first and second transistors 45, 46 having their emitters connected in common to the negative terminal of an auxiliary constant voltage source. The positive terminal of the auxiliary source, represented by E', is connected by means of a resistor 47 and capacitor 48 to the junction between two primary windings on a saturating core transformer generally designated 17. These windings are designated respectively 50 and 51. The saturating core transformer 17 includes a third primary terminal 52, and a secondary winding 53 which is connected between the capacitor 15 and the diode 19, as shown. Diodes 55 and 56 are connected in the emitter circuits respectively of the transistors 45, 46.

In operation, the source E' supplies voltage through the primary winding 51 to the collector of transistor 45. When the system is first turned on, the surge of voltage through the primary 51 will cause an induced voltage, in the polarity shown by the dots, in the primary winding 52. This polarity is such as to forward-bias the emitter/base junction of transistor 45, causing it to be slightly forward biased. An avalanche effect follows, whereby additional current is allowed to flow through the winding 51, further increasing the forward bias on transistor 45. The current forward-biasing transistor 45 is returned through forward-biased diode 56 to the winding 52. After a time, the reactor 17 will saturate; and the change of flux in the winding 51 will reduce, thereby changing polarity of the voltage in the winding 52. Thus, the transistor 45 will become reverse biased, and the new polarity will tend to cause transistor 46 to conduct, with complementary action on the winding 50. Thus, the secondary winding 53 generates a train of positive waveforms which are coupled through the diode 19 and the primary SCR 12 (when it is conducting) to charge the commutation capacitor 15.

When the secondary SCR 14 is caused to conduct (by conduction of the unijunction transistor 28), the capacitor 15 is placed across the primary SCR 12 and shuts it off. At this time, the load current is shunted through the secondary SCR 14 and flows directly through the capacitor 15. After SCR 12 is shut off, the load current reduces to zero, and the secondary SCR 14 shuts off without further action. The system is ready to be recycled.

It will thus be appreciated that even if a charge is temporarily lost on the commutation capacitor 15, during the subsequent cycling by the generator 26, the commutation charge will be restored so that the next time the secondary SCR 14 conducts, the new charge on the commutation capacitor 15 is available to shut off the primary SCR 12, its trigger voltage having been dissipated. We have found, therefore, that the use of the independent voltage source 16 and the arrangement wherein the commutation capacitor 15 is charged during the time that the primary SCR conducts, we have achieved a much more reliable commutation operation.

Having thus disclosed a preferred embodiment of our invention in detail, persons skilled in the art will be able to modify certain of the circuitry which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. A commutation chopper system for supplying energy from a constant voltage source to a load comprising: a primary gatable switch connected between said source and said load; a secondary gatable switch and a commutation capacitor connected in series across said first gatable switch; an independent source of voltage and unidirectional current conducting means connected in series circuit between said commutation capacitor and the junction between said first and second gatable switches and of a polarity so as to charge said commutation capacitor when said first gatable switch conducts; and trigger circuit means for applying a first trigger pulse to said first gatable switch to cause the same to conduct and for applying a second trigger pulse to said second gatable switch a predetermined time after said first switch conducts; whereby when said first switch conducts, said commutation capacitor is charged directly by said independent voltage source less only the voltage drops across said conducting first switch and said unidirectional current conducting means, and when said second switch conducts, said commutation capacitor is connected across said first gatable switch in a polarity to shut it off.

2. The system of claim 1 wherein each of said gatable switches is a silicon control rectifier.

3. The system of claim 1 wherein said independent voltage source comprises transformer means and a diode connected in series between said commutation capacitor and the junction between said first and second switches and said voltage source for continuously supplying a voltage to charge said commutation capacitor when said first switch is conducting and said second switch is non-conducting.

4. The system of claim 3 wherein said independent voltage source further comprises a saturable reactor having first, second and third primary windings; a first switch coupled to said first winding; a second switch coupled to said second winding, and feedback circuitry coupled to said third primary winding for alternately causing said first and second switches to conduct.

* * * * *

UNITED STATES PATENT OFFICE
CERTIFICATE OF CORRECTION

Patent No. 3,919,622            Dated November 11, 1975

Inventor(s) Mudhafar A. Al-Nema, et al

It is certified that error appears in the above-identified patent and that said Letters Patent are hereby corrected as shown below:

Please complete the title to read:

COMMUTATION CHOPPER CIRCUIT WITH INDEPENDENT

TRIGGER SOURCE

Signed and Sealed this

*tenth* Day of *February 1976*

[SEAL]

Attest:

RUTH C. MASON            C. MARSHALL DANN
*Attesting Officer*            *Commissioner of Patents and Trademarks*